United States Patent
Salgado et al.

(10) Patent No.: US 9,544,132 B2
(45) Date of Patent: Jan. 10, 2017

(54) CRYPTOGRAPHIC METHOD FOR PROTECTING A KEY HARDWARE REGISTER AGAINST FAULT ATTACKS

(71) Applicant: GEMALTO SA, Meudon (FR)

(72) Inventors: Stephanie Salgado, Meudon (FR); Fabrice Perion, Meudon (FR)

(73) Assignee: GEMALTO SA, Meudon (FR)

( * ) Notice: Subject to any disclaimer, the term of this patent is extended or adjusted under 35 U.S.C. 154(b) by 93 days.

(21) Appl. No.: 14/363,887

(22) PCT Filed: Nov. 30, 2012

(86) PCT No.: PCT/EP2012/074063
§ 371 (c)(1),
(2) Date: Jun. 9, 2014

(87) PCT Pub. No.: WO2013/083485
PCT Pub. Date: Jun. 13, 2013

(65) Prior Publication Data
US 2014/0301553 A1 Oct. 9, 2014

(30) Foreign Application Priority Data
Dec. 7, 2011 (EP) .................................... 11306622

(51) Int. Cl.
*H04L 9/00* (2006.01)
*G06F 21/55* (2013.01)

(52) U.S. Cl.
CPC ............... *H04L 9/004* (2013.01); *G06F 21/55* (2013.01); *G06F 21/558* (2013.01); *H04L 2209/26* (2013.01)

(58) Field of Classification Search
CPC ...... H04L 9/004; H04L 9/0675; H04L 9/0693; G06F 21/55; G06F 21/558
(Continued)

(56) References Cited

U.S. PATENT DOCUMENTS

2006/0236102 A1* 10/2006 Golic .................... H04L 9/0618
713/168
2008/0152144 A1* 6/2008 Douguet ................. H04L 9/004
380/277
(Continued)

OTHER PUBLICATIONS

PCT/EP2012/074063, International Search Report, Dec. 17, 2012, European Patent Office, P.B. 5818 Patentlaan 2 NL—2280 HV Rijswijk.
(Continued)

*Primary Examiner* — Kambiz Zand
*Assistant Examiner* — Noura Zoubair
(74) *Attorney, Agent, or Firm* — The Jansson Firm; Pehr B. Jansson

(57) ABSTRACT

The present invention relates to cryptographic method that are resistant to fault injection attacks, to protect the confidentiality and the integrity of secret keys. For that, the invention describes a method to protect a key hardware register against fault attack, this register being inside an hardware block cipher BC embedded inside an electronic component, said component containing stored inside a memory area a cryptographic key K, characterized in that it comprises following steps: A.) loading the key Kram inside said register; B.) computing a value X such as K=BC(K,X); C.) after at least one sensitive operation, computing a value V such as V=BC(K,X); D.) matching the value V with the key Kram value stored in the memory area; E.) if the matching is not ok detecting that a fault occurs.

14 Claims, 1 Drawing Sheet

(58) Field of Classification Search
USPC .................. 380/28, 44, 45, 277; 713/168
See application file for complete search history.

(56) References Cited

U.S. PATENT DOCUMENTS

2009/0285398 A1* 11/2009 Liardet ................ H04L 9/0625
                                                                             380/277
2009/0316906 A1   12/2009 Pelletier
2011/0103584 A1    5/2011 Liardet et al.
2011/0222684 A1    9/2011 Liardet et al.

OTHER PUBLICATIONS

PCT/EP2012/074063, Written Opinion of the International Searching Suthority, Dec. 17, 2012, European Patent Office, D-80298 Munich.

* cited by examiner

US 9,544,132 B2

CRYPTOGRAPHIC METHOD FOR PROTECTING A KEY HARDWARE REGISTER AGAINST FAULT ATTACKS

FIELD OF THE INVENTION

The present invention relates to cryptographic method that are resistant to fault injection attacks, to protect the confidentiality and the integrity of secret keys. Particularly, the invention relates to a cryptographic method for protecting a key hardware register against fault attacks.

BACKGROUND OF THE INVENTION

Cryptographic operations are used for a variety of processes such as data encryption and authentication. In a typical symmetrical cryptographic process, a secret key is known by two or more participants, who use it to secure their communications. In systems using asymmetric (or public key) cryptography, one party typically performs operations using a secret key (e.g., the so-called private key), while the other performs complementary operations using only non-secret parameters (e.g., the so-called public key). In both symmetric and asymmetric cryptosystems, secret parameters must be kept confidential, since an attacker who compromises a key can decrypt communications, forge signatures, perform unauthorized transactions, impersonate users, or cause other problems.

Methods for managing keys securely using physically secure, well-shielded rooms are known in the background art and are widely used today. However, previously-known methods for protecting keys in low-cost cryptographic devices are often inadequate for many applications, such as those requiring a high degree of tamper resistance. Attacks such as reverse-engineering of ROM using microscopes, timing attack cryptanalysis (see, for example, P. Kocher, *Timing Attacks on Implementations of Diffie-Hellman, RSA, DSS, and Other Systems; Advances in Cryptology* CRYPTO '96, Springer-Verlag, pages 104-113), and error analysis (see, for example, E. Biham and A. Shamir, *Differential Fault Analysis of Secret Key Cryptosystems; Advances in Cryptology*; CRYPTO '97, Springer-Verlag, 1997, pages 513-525) have been described for analyzing cryptosystems.

Ciphers and algorithms believed to be cryptographically secure are known in the background art. For example, protocols using triple DES (a cipher constructed using three applications of the Data Encryption Standard using different keys) can resist all feasible cryptanalytic attacks, provided that attackers only have access to the standard inputs to and outputs from the protocol. However, even a product using an extremely strong cipher such as triple DES can be insecure if the attacker can generate a physical (perturbation), such as fault.

These attacks are very critical if they occur on a Key register. Indeed, a special feature of the key register, embedded in most of cryptographic elements, is that it is not possible to read it. Allowable actions are generally "use-it" or "load-it".

The "use-it" command permits to use such register during a cryptographic computation, the "load-it" command permits to load a key inside such register. Such registers are used, for example inside hardware cryptographic blocks cipher.

Such attacks can be operating as follow:

The attacker physically targets at least one bit of a register of the block cipher (he knows which bit position is attacking and we consider that the attack always causes the same perturbation (1−>0 or 0−>1)).

If the result of the block cipher execution is false or if it has no result (the fault has been detected), he knows that the previous value of the bit targeted was 1. Otherwise, (after several tentative), if the result is correct the targeted the previous value of the targeted bit was 0. By attacking bit after bit allows an attacker to retrieve all bits of the secret.

To implement such attack, the attacker can redo the same fault, several times. This attack is very efficient if it occurs during the key loading step or when the key has been loaded in the key register because the register is easy to locate into the block cipher. The impact of the attack will be readable after the block cipher execution (done with the modified key value).

Currently available protection mechanisms are implemented off-line and are not suitable for all applications. For example, existing mechanisms would not offer protection to session keys, which are generated as needed rather than in advance.

Hagai Bar-El et al., in "The Sorcerer's Apprentice Guide to Fault Attacks", Discretix Technologies White Paper, given at Workshop on Fault Detection and Tolerance in Cryptography, Florence Italy, 30 Jun. 2004 (Cryptology ePrint Archive (eprint.iacr.org) Report 2004/100; also, Cite-Seer article 705084), describe various methods of implementing such fault attacks on electronic cryptographic circuits, and suggest a number of countermeasures. The countermeasures mainly involve introducing redundancy in which operations are recomputed and the results compared, on the assumption that identical faults cannot be replicated. The resulting system is admitted to be slower and less efficient, but that is conceded to be part of the cost of security.

Other known counter measures exist for specific algorithm such the DES/3DES (for Data Encryption Standard and Triple Data Encryption Standard), as known in the patent WO2010046251.

The solution proposed in the invention is not applicable to all block ciphers, because based on a mathematical property of the DES algorithm.

SUMMARY OF THE INVENTION

This invention describes processes in which a dummy operation is associated to the block cipher BC computation, to verify the validity of the used key.

More precisely, the invention describes a method to protect a key hardware register against fault attack, this register being inside a hardware block cipher BC embedded inside an electronic component, said component containing stored inside a memory area, a cryptographic key Kram. This method comprises following steps:

characterized in that it comprises following steps:
A. loading the key Kram inside said register,
B. computing a value X such as K=BC(K,X),
C. after at least one sensitive operation, computing a value V such as V=BC(K,X),
D. matching the value V with the key Kram value stored in the memory area,
E. if the matching is not ok detecting that a fault occurs.

According to an embodiment, said key K is not reloaded between said sensitive operation and said computing of value V.

The block cipher BC is reversible, or the block cipher BC is such as an inverse block cipher $BC^{-1}$ exists. If the block cipher BC is such as it exists an inverse block cipher $BC^{-1}$, the X value can be computed using said $BC^{-1}$ block cipher such as $X=BC^{-1}(K,K)$.

According to an embodiment, steps D and E can be associated to a "key loading" operation, or steps D and E can be realized before every "key loading" operation. In such embodiment, before step C, a flag can be raised. Then before any "key loading" operation, said flag value can be checked, if said flag has been raised, steps D and E can be realized.

Other characteristics and advantages of the present invention will emerge more clearly from a reading of the following description of a number of preferred embodiments of the invention with reference to the corresponding accompanying drawings in which.

DETAILED DESCRIPTION OF THE INVENTION

Figure 1:
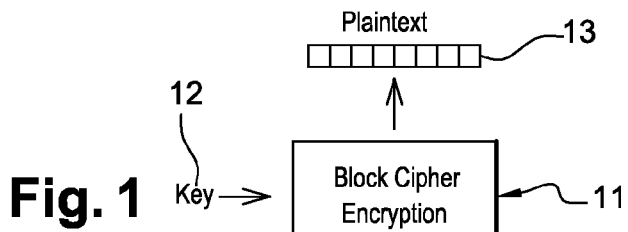
FIG. 1 depicts a generic block cipher.

The following discussion is presented to enable a person skilled of the art to make the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principle and features disclosed herein.

Same elements have been designated with same reference numeral in the different drawings.

For clarity, only those elements which are useful to the understanding of the present invention have been shown in the drawings and will be described hereafter. In particular the exploitation of the possible fraud detection has not been detailed, embodiments of the present invention being compatible with the exploitation conventionally made of fraud attempt detection.

In cryptography, a block cipher is a symmetric key cipher operating on fixed-length groups of bits, called blocks, with an unvarying transformation. A block cipher encryption algorithm might take of plaintext as input, and output a corresponding block of ciphertext. The exact transformation is controlled by using at a second input the secret key. In the present invention, the term "block Cipher (BC)" designates a hardware implementation of a block cipher. Such BC is typically embedded inside an electronic component that can be part of an electronic device. Such device can be for example smart card, mobile phone, USB Key, or every kind of device that need such cryptographic functionalities.

In the FIG. 1, we can see a schematic bloc cipher. Such block cipher is, for example, included inside a cryptographic component on an electronic device such as a smart card. The block cipher 11 receives a message 13 and a key 12. The key 12 is used by a cryptographic algorithm 15 embedded inside the block cipher 11, to cipher a message 13.

Some cipher are reversible. This means that, if the message 13 is a clear text, the result 14 is a ciphered text, if the message 13 is a ciphered text, the result 14 is a clear text.

Other cipher blocs are not reversible but an inverse cipher exists. This means that, if the message 13 is a clear text, the result 14 is a ciphered text, using a cipher block BC. There is another cipher block $BC^{-1}$ such as, if the message 13 is the ciphered text, the result 14 is the clear text.

The cryptographic algorithm 15 can be any symmetrical algorithm, such as all known by the person skilled in the art, or every proprietary one. In the present description, we will take the example of an AES block Cipher.

The key 12, transmitted to the block cipher, is loaded in a key register to be usable.

Figure 2:
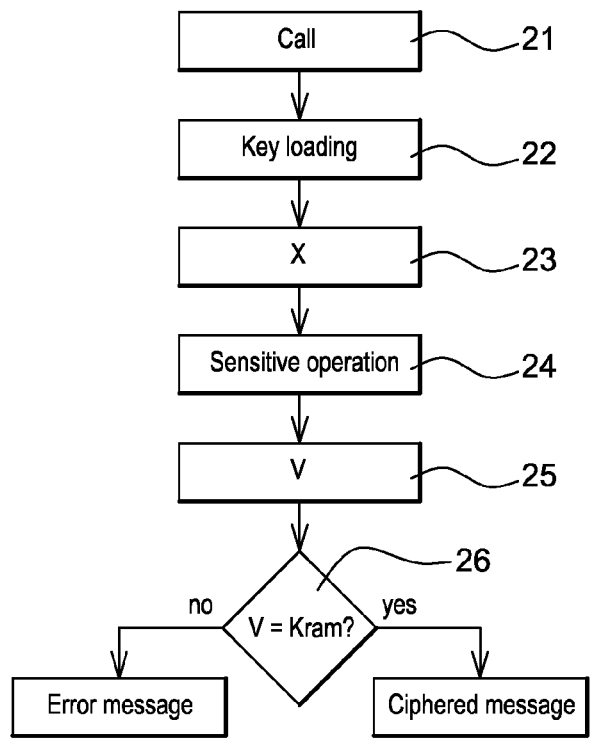
FIG. 2 depicts a functional diagram of the present invention in an "iterative" embodiment.

A first embodiment of the invention is described in the FIG. 2. The figure takes place after a functional call 21 of the block cipher. This call is done with at least two parameters: a message M to cipher (or decipher), and a key. This key is stored in a memory, for example Random Access Memory (RAM), and called Kram. The key can be stored in every kind of memory, such as "Non Volatile Memory" (NVM), "Read Only Memory" (ROM), "Random Access Memory" (RAM), . . . .

The block 22, in FIG. 2, depicts the key loading inside a key register. This operation is very important because, after it, it will not be possible to check "easily" the key value. During this step, the value of the key Kram, is written inside the key register.

In another embodiment of the invention, the key loading could occur before the Block Cipher call.

According to the present invention, then a step 23 of "cocking" is done. During this step, a value X is obtained. X is such as $K=BC(K, X)$. In the case of a cipher BC, with an inverse cipher block $BC^{-1}$ corresponding, X value can be obtained such as:

$X=BC^{-1}(K,K)$. If the block cipher BC is reversible, X value can be obtained such as: $X=BC(K,K)$.

Depending on the implementation, the X values, associated with the K keys, can be:

1 computed just before use 2 pre-computed inside the electronic component 3 pre-computed using other computers, and loaded inside the electronic component, for example at the same time as K keys are loaded.

Step 24 is a sensitive operation, typically the normal call of the block cipher.

Then a step 25 is realized. In this step 25, a new value V is computed such as $V=BC(K, X)$ The value V is compared, at step 26, to the key value Kram stored in memory. According to the definition of the value X, the value V should be equal to the Kram value. If V and Kram do not match, it means that an incident occurs between the step 23 and the step 25. This incident (typically a fault attack) can have impact on one of the values used during the step 24, such as K value, X value, or Kram value.

It is important that no key loading operation occurs on the register that contains K, between step 24 and step 25.

In this embodiment, the block cipher BC is called two times, and the block cipher $BC^{-1}$ one time if the value X has been onboard computed.

Figure 3:
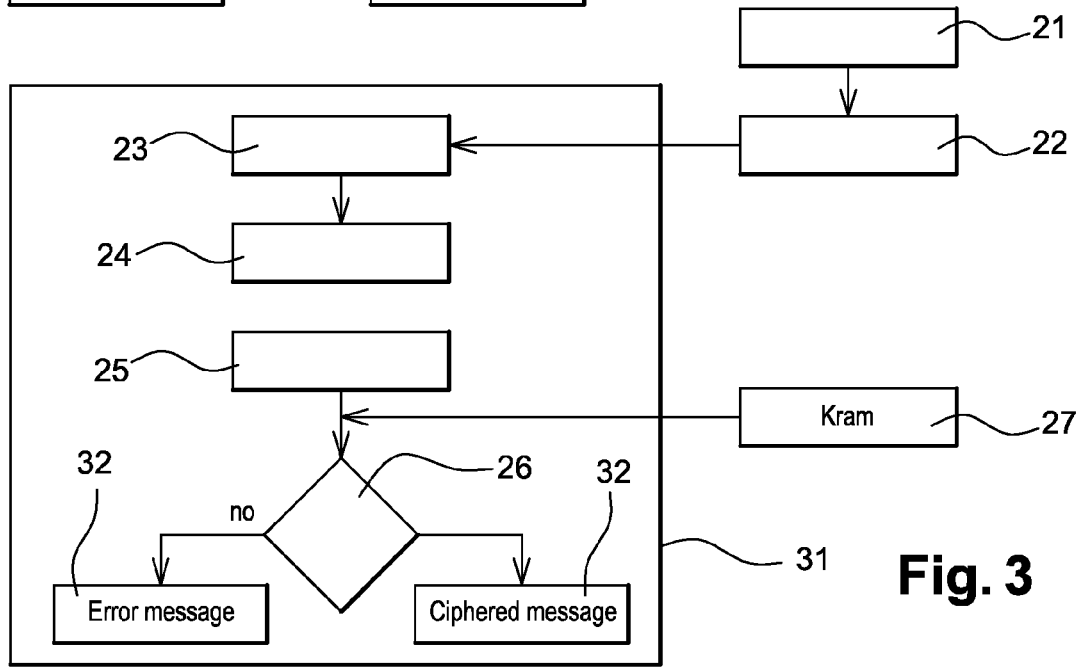
FIG. 3 depicts a functional diagram of the present invention in a "monoblock" embodiment.

In another embodiment, as described in the FIG. 3, the steps 23, 24, 25 and 26 are embedded inside the block cipher 31. In this embodiment, the block cipher 31 must be able to read the Kram value 27 in the memory, to realize the matching step 26. In this embodiment, the result 32 can be the ciphered message if the match 26 was ok, or an error message if the match 26 was not ok.

The invention adds only step 23 and step 25, to the normal call of a block cipher. These two steps are simple call of a block cipher, without additional key loading, or "heavy" operation. If the step 23 is realized before the block cipher call 21, only the step 25 is really added the normal call of a block cipher. That permits to the invention to provide a fault detection mechanism with very small performance impact.

The invention, in the embodiment of an onboard computing of X value, is typically adapted to the load of new key values inside the electronic device that contains such BC. This solution does not need the loading of a reference value, associated to said new key.

A particularly interesting implementation of the invention, consist in executing the step 25, before the next "key loading", that follows a sensitive operation (typically the call of the BC). For performances reason, it can be decided to not implement the present invention for each call of the block cipher BC. But, in this implementation, steps 22 and 23 are done before the first call of BC (step 24). Then, several operations can be done (several calls of BC, call of other block ciphers . . . ) while the Key register that contains the K value is not changed. If a new key loading operation is called, the step 25 is realized before. This implementation permits to verify that, at the end of the use of K value, this one has not been modified. This implementation can be done, for example, modifying the 'key loading' operation to realize step 25 systematically, or only if needed. Such modification can be, for example:

Realization of step 22
Realization of step 23
Call of a "sensitive operation":
  raise of a specific flag (this flag will permit to the next key loading operation, to know that the step 25 must be done before the next key loading)
  sensitive operation (call of block cipher)
  eventual other operations (sensitive or not)
"Key loading" call:
  check the value of a specific flag
  if said flag has been raised, realization of step 25
    if fault has been detected, then treatment
  if everything is ok, load of the new key value in the register.

The invention claimed is:

1. A method to protect a key hardware register against fault attack, this register being inside a hardware block cipher BC embedded inside an electronic component, said component containing, stored inside a memory area, a cryptographic key Kram, the method comprises:
   A. loading the key Kram inside said register,
   B. determining a value X wherein the value X is uniquely defined such that application of the block cipher to the value X using the key K, the resulting cipher text has exactly a value equal to the key K, i.e., K=BC(K,X), wherein key K is the key Kram loaded inside said register,
   C. after at least one sensitive operation, computing a value V such as V=BC(K,X),
   D. comparing the value V with the key Kram value stored in the memory area,
   E. if the value V is not equal to the key Kram, raising an error that a fault has occurred.

2. The method according to the claim 1, wherein said key Kram is not reloaded between said sensitive operation and said computing of value V.

3. The method according to the claim 1, wherein the block cipher BC is reversible.

4. The method according to the claim 1, wherein the block cipher BC is such as an inverse block cipher $BC^{-1}$ exists.

5. The method according to claim 4, wherein X value is computed using said $BC^{-1}$ block cipher such as $X=BC^{-1}(K,K)$.

6. The method according to claim 1, wherein steps D and E are carried out before a subsequent key loading operation.

7. The method according to claim 6, wherein before step C, a flag is raised.

8. The method according to claim 7, wherein before a key loading operation, said flag value is checked, if said flag has been raised, step D and E are realized.

9. A hardware block cipher comprising a set of instructions, which when loaded into said block cipher, causes the block cipher to carry out the cryptographic method to protect a key hardware register against fault attack comprising instructions to cause the hardware block cipher to protect the key hardware register by:
   A. loading the key Kram inside said register,
   B. computing a value X wherein the value X is uniquely defined such that application of the block cipher to the value X using the key K, the resulting cipher text has exactly a value equal to the key K, i.e., K=BC(K,X), wherein key K is the key Kram loaded inside said register,
   C. after at least one sensitive operation, computing a value V such as V=BC(K,X),
   D. comparing the value V with the key Kram value stored in the memory area,
   E. if the value V is not equal to the key Kram, raising an error that a fault has occurred.

10. An electronic component comprising an embedded hardware block cipher having a set of instructions, which when loaded into said block cipher, causes the block cipher to carry out the cryptographic method to protect a key hardware register against fault attack comprising instructions to cause the hardware block cipher to protect the key hardware register by:
   A. loading the key Kram inside said register,
   B. computing a value X wherein the value X is uniquely defined such that application of the block cipher to the value X using the key K, the resulting cipher text has exactly a value equal to the key K, i.e., K=BC(K,X), wherein key K is the key Kram loaded inside said register,
   C. after at least one sensitive operation, computing a value V such as V=BC(K,X),
   D. comparing the value V with the key Kram value stored in the memory area,
   E. if the value V is not equal to the key Kram, raising an error that a fault has occurred.

11. The method according to claim 2, wherein the block cipher BC is reversible.

12. The method according to claim 2, wherein the block cipher BC is such as an inverse block cipher $BC^{-1}$ exists.

13. The method according to claim 12, wherein X value is computed using said $BC^{-1}$ block cipher such as $X=BC^{-1}(K,K)$.

14. The method according to claim 2, wherein steps D and E are carried out before a subsequent key loading operation.

* * * * *